United States Patent
Hugot et al.

(10) Patent No.: US 11,258,798 B2
(45) Date of Patent: Feb. 22, 2022

(54) METHOD, ENTITY AND SYSTEM FOR MANAGING ACCESS TO DATA THROUGH A LATE DYNAMIC BINDING OF ITS ASSOCIATED METADATA

(71) Applicants: THALES DIS FRANCE SAS, Meudon (FR); THALES DIS CPL USA, INC., Belcamp, MD (US)

(72) Inventors: Didier Hugot, Le Plessis Robinson (FR); Asad Ali, Austin, TX (US); Gorav Arora, San Jose, CA (US)

(73) Assignees: THALES DIS FRANCE SAS, Meudon (FR); THALES DIS CPL USA, Inc., Belcamp, MD (US)

( * ) Notice: Subject to any disclaimer, the term of this patent is extended or adjusted under 35 U.S.C. 154(b) by 333 days.

(21) Appl. No.: 15/906,833

(22) Filed: Feb. 27, 2018

(65) Prior Publication Data
US 2019/0268341 A1 Aug. 29, 2019

(51) Int. Cl.
*H04L 29/06* (2006.01)
*G06F 21/62* (2013.01)
(Continued)

(52) U.S. Cl.
CPC .......... *H04L 63/102* (2013.01); *G06F 21/31* (2013.01); *G06F 21/602* (2013.01);
(Continued)

(58) Field of Classification Search
CPC ....... H04L 63/102; H04L 9/32; H04L 63/107; H04L 63/20; H04L 63/08; H04L 9/0894;
(Continued)

(56) References Cited

U.S. PATENT DOCUMENTS 8,909,943 B1 12/2014 Shankar et al.
8,914,632 B1 12/2014 Shankar et al.
(Continued)

FOREIGN PATENT DOCUMENTS

WO 2016/019093 A1 2/2016

OTHER PUBLICATIONS

Notification of Transmittal of the International Search Report and the Written Opinion of the International Searching Authority (Forms PCT/ISA/220, PCT/ISA/210, and PCT/ISA/237) dated Apr. 17, 2019, in corresponding International Application No. PCT/EP2019/053313. (12 pages).

*Primary Examiner* — Alexander Lagor
*Assistant Examiner* — Wansik You
(74) *Attorney, Agent, or Firm* — Marc Boillot—THALES DIS CPL USA, Inc (57) ABSTRACT

A method, an entity, and a system for managing access to data. The data is associated with metadata. At least one predetermined access policy for accessing metadata includes, for each client, at least one identifier relating to the client. An entity receives from at least one client device, a data access request that includes at least one identifier relating to the client. The entity determines, based on the associated access policy, whether the metadata access is authorized. If yes, the entity determines, based on the associated access policy, associated first data allowing to access the metadata. The entity accesses, based on the first data, the associated metadata. The entity accesses, based on the accessed metadata and the associated access policy, at least a part of the associated data, as a late dynamic binding of the metadata with the associated data (or a part of it).

10 Claims, 2 Drawing Sheets

(51) Int. Cl.
    *G06F 21/31*     (2013.01)
    *H04L 9/32*      (2006.01)
    *G06F 21/60*     (2013.01)
    *H04L 9/08*      (2006.01)

(52) U.S. Cl.
    CPC ............ *G06F 21/604* (2013.01); *G06F 21/62* (2013.01); *H04L 9/0894* (2013.01); *H04L 9/32* (2013.01); *H04L 63/08* (2013.01); *H04L 63/101* (2013.01); *H04L 63/107* (2013.01); *H04L 63/20* (2013.01); *G06F 2221/2107* (2013.01); *G06F 2221/2141* (2013.01)

(58) Field of Classification Search
    CPC ... H04L 63/101; H04L 9/3226; H04L 9/0866; H04L 2209/42; G06F 21/31; G06F 21/602; G06F 21/604; G06F 21/62; G06F 2221/2107; G06F 2221/2141
    See application file for complete search history.

(56)                References Cited

U.S. PATENT DOCUMENTS

| | | | |
|---|---|---|---|
| 9,875,347 B2* | 1/2018 | Baghdasaryan | G06Q 20/40 |
| 2014/0289539 A1* | 9/2014 | Osterwalder | G06F 21/6218 |
| | | | 713/193 |
| 2015/0318998 A1* | 11/2015 | Erlikhman | H04L 9/0863 |
| | | | 713/171 |
| 2016/0234215 A1* | 8/2016 | Shankar | H04L 63/10 |
| 2016/0342588 A1* | 11/2016 | Judd | G06F 16/137 |
| 2017/0078095 A1* | 3/2017 | Iyer | H04L 63/083 |
| 2019/0273612 A1* | 9/2019 | Sinha | H04L 9/3242 |

* cited by examiner

METHOD, ENTITY AND SYSTEM FOR MANAGING ACCESS TO DATA THROUGH A LATE DYNAMIC BINDING OF ITS ASSOCIATED METADATA

FIELD OF THE INVENTION

The present invention relates generally to a method for managing access to data.

The concerned invention also pertains to an entity for managing access to data. The entity may include a server.

Furthermore, the invention pertains to a system for managing access to data as well. The system comprises one or several entities and one or several devices.

The present invention is notably applicable to a field in which the device(s) include(s) e.g. a Personal Computer (or PC), a mobile (tele)phone, an Internet Of Things (or IoT) device, a Secure Element (or SE) and/or any other computing device.

Within the present description, an SE is a software and/or hardware component, as a smart object that includes a chip(s) that protect(s), as a possibly tamper resistant component(s), access to stored data and that is intended to communicate data with a device(s), like e.g., an SE host device, and/or an SE user.

STATE OF THE ART

It is known to use an Access Control List (or ACL) to define a list of access permissions/rules attached to data, so as to protect access to the concerned data.

However, once a user has been authenticated, s/he gets access, based on a corresponding ACL, to the data and associated metadata. The same ACL controls access to both data and metadata. Thus, once you have access to data, you also have access to metadata and vice versa. Furthermore, even if an attacker does not gain access to metadata and data, the attacker may be able to determine which metadata belongs to which data. The attacker can therefore focus the effort on breaking the data of interest and then gain access to the associated metadata.

There is a need of an alternative solution which offers stronger protection to both data and associated metadata than such an aforementioned known solution.

SUMMARY OF THE INVENTION

The invention proposes a solution for satisfying the just herein above specified need by providing a method for managing access to data.

According to the invention, the data is associated with metadata. At least one predetermined access policy for accessing metadata includes, for each of at least one client, at least one identifier relating to the client. The method comprises:

a) receiving, by an entity, from at least one client device, a data access request for accessing data, the data access request including at least one identifier relating to the requesting client;

b) determining, by the entity, based on the associated access policy, whether the metadata access is or is not authorized, as an access decision;

c) determining, by the entity, only if the metadata access is authorized, based on the associated access policy, associated first data allowing to access the metadata;

d) accessing, by the entity, based on the first data, the associated metadata; and e) accessing, by the entity, based on the accessed metadata and the associated access policy, at least a part of the associated data, as a late dynamic binding of the metadata with the at least a part of the associated data.

The principle of the invention consists in controlling, by an entity, such as a server, access, according to a predefined access policy(ies), to data requested by a client. Once the client is authorized, the entity (or another entity connected hereto) accesses, according to the associated access policy, associated first data allowing to access metadata associated to the data. Then, the entity accesses, based on the accessed metadata and the associated access policy, a part or all of the associated data.

Within the present description, the access policy defines what a client, i.e. a human and/or a software and/or a hardware component(s), is allowed or authorized to access, as firstly metadata and as secondly the part or all of the associated data.

The access policy may include one or several conditions for one or several other context signals to be successfully satisfied, e.g. at least present, i.e. identified or detected.

The access decision may be to grant possibly conditionally or deny access, through the associated metadata, to at least a part of the (requested) data.

The access decision may depend on a predefined context authorization and the associated access policy(ies).

The access decision may be issued and let another entity, such as a server connected to the access decision providing entity, access at least a part of the requested data, through the associated metadata.

Within the present description, metadata is a description of at least a part of data associated hereto.

The access to the part or all of the data implies therefore firstly accessing metadata which may include a location of the data (or the part of the data), a policy(ies) that govern(s) access to the associated data (or the part of the data), and an encryption key(s) that protect(s) the associated data and/or encryption information, such as an encryption algorithm, IV, a key length and/or a block size.

The invention solution relies on a late dynamic association, link or binding between metadata and associated data (or a part of the data).

The invention solution allows enhancing the protection to both metadata and data (or a data part) associated hereto with respect to the aforementioned prior art solution.

The invention solution offers a protection against data breaches and data leaks, since data cannot be traced back to their respective clients.

Contrary to the aforementioned prior art solution, data is stored without associating to its associated metadata and therefore its client. Thus, in case of data breach, due to an absence of association of the data (or a data part) with its metadata, it is not possible to tie or associate the concerned data up to a particular client. The data is thus rendered anonymous and not exploitable by a potential attacker irrespective of whether a layer(s), such as an encryption(s) and/or other form(s) of data obfuscation(s), of (data) protection is or is not applied to the concerned data.

The access policy associates preferably to the client a corresponding authentication policy. The associated authentication policy includes a corresponding required client authentication process(es) to be carried out for the client to access the metadata and a corresponding (respective) reference client authentication data item(s).

Once the client is authorized (and preferably previously (successfully) authenticated), the client accesses metadata. Such an access to metadata now provides access to the data (or a part of the data) associated hereto. In other words, an association of requested data (or a part of the requested data) with its metadata is revealed only after the entity has authorized (and preferably previously authenticated) the requesting client.

Such a late dynamic binding is possible by using client credential(s) as necessary input(s) to expose the association, when a previous authentication is to be performed. In such a case, without any successful client authentication(s), the metadata and data (or a data part) association cannot be determined. Therefore, an entity unilaterally cannot associate metadata with data (or a data part), unless the client authenticates first possibly in several predefined manners according to the associated authentication policy.

According to an additional aspect, the invention is an entity for managing access to data.

According to the invention, the data is associated with metadata. At least one predetermined access policy for accessing metadata includes, for each of at least one client, at least one identifier relating to the client. The entity is configured to receive, from at least one client device, a data access request for accessing data, the data access request including at least one identifier relating to the requesting client. The entity is configured to determine, based on the associated access policy, whether the metadata access is or is not authorized, as an access decision. The entity is configured to determine, only if the metadata access is authorized, based on the associated access policy, associated first data allowing to access the metadata. The entity is configured to access, based on the first data, the associated metadata. And the entity is configured to access, based on the accessed metadata and the associated access policy, at least a part of the associated data, as a late dynamic binding of the metadata with the at least a part of the associated data.

According to still a further aspect, the invention is a system for managing access to data.

According to the invention, the system comprises at least one entity and at least one device. The data is associated with metadata. At least one predetermined access policy for accessing metadata includes, for each of at least one client, at least one identifier relating to the client. The at least one entity is configured to receive, from at least one client device, a data access request for accessing data, the data access request including at least one identifier relating to the requesting client. The at least one entity is configured to determine, based on the associated access policy, whether the metadata access is or is not authorized, as an access decision. The at least one entity is configured to determine, only if the metadata access is authorized, based on the associated access policy, associated first data allowing to access the metadata. The at least one entity is configured to access, based on the first data, the associated metadata. And the at least one entity is configured to access, based on the accessed metadata and the associated access policy, at least a part of the associated data, as a late dynamic binding of the metadata with the at least a part of the associated data.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered an exemplary embodiment in which the invention method for managing access to data is implemented notably by a user, as a client, a PC, as a (computing) device and a standalone entity, i.e. without cooperating with another device, such as an SE, and a remote server, as a data access manager and a standalone entity.

According to still another exemplary embodiment (not represented), the invention method for managing access to data is implemented by a device in cooperation with an SE embedded within or connected to the device. According to such an embodiment, the SE, as a local and data access manager, is adapted to perform the functions that are carried out by the server and described herein below while enhancing the security of stored and/or processed data.

The SE may be an incorporated chip, as a chip soldered, possibly in a removable manner, like e.g., an embedded SE, a Trusted Execution Environment (or TEE), as a secure area of a PC processor and a secured runtime environment, an embedded Universal Integrated Circuit Card (or eUICC) or an integrated Universal Integrated Circuit Card (or iUICC), on a Printed Circuit Board (or PCB) of the SE host device, or a chip that is coupled to a host device and included within a Universal Serial Bus (or USB), a smart card or any other medium (that may have different form factors), as an SE host device. The chip may thus be fixed to or removable from its host device, like e.g., the PC (or a mobile phone).

Instead of being (or additionally to) a hardware component, the SE may (also) be a software component.

The invention does not impose any constraint as to a kind of the SE type.

According to still another exemplary embodiment (not represented), the invention method for managing access to data is implemented by a device in cooperation with a local or remote server. According to such an embodiment, the device, as a client device, supports one or several client applications and is adapted to perform the functions that are carried out by the user and the PC and described herein below.

Naturally, the herein below described embodiment is only for exemplifying purposes and is not considered to reduce the scope of the present invention.

Figure 1:
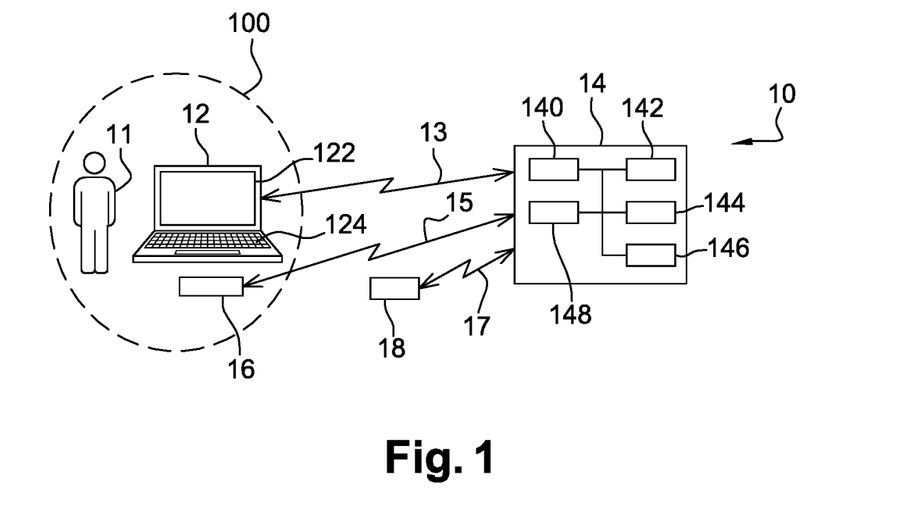
FIG. 1 illustrates a simplified diagram of an exemplary embodiment of a system comprising a PC and a server, the PC being configured to send, on an initiative of a user (or client), to the server a request for accessing data, the server being configured to control, based on a corresponding predefined Access Policy (or AP), access to the data, through metadata associated hereto, according to the invention.

FIG. 1 shows schematically a data access managing system 10.

Such a system 10 includes a user 11, as a client, a PC 12, as a (computing) device, and a remote (web) server 14, as an entity.

For the sake of simplicity, only one user 11 and only one PC 12 have been represented at the client side.

However, the invention is applicable when the server 14, as a data access manager, manages a set of clients (user and/or application) that may, each, use one or several devices, at the client side.

A mapping or association between data and associated metadata allows that the data (or a data part) is accessible only through its associated metadata after an authorization that is defined by a predefined associated AP.

The data remains inaccessible as long as the client (namely the user 11 in the described embodiment) is not authorized at the server side.

The system is preferably arranged to authenticate successfully (or not), a client, based on a predefined associated AUthentication Policy (or AUP), and access (or not) to data requested by the client through metadata associated hereto, based on the AP.

The AUP includes, for each client registered at the data access manager, one or several predefined requirements relating to an associated predefined authentication process(es) relating to the concerned client, namely relating to the user 11, that the client has to undergo and pass, so as to be authenticated. Such an authentication provides the necessary condition to be satisfied and which, when successful, allows accessing associated metadata and then the data or a data part according to the associated AP.

The AUP includes, for each client registered at the data access manager, one or several predetermined reference client authentication data items, such as a reference PIN, a reference OTP and/or a reference password, that has(have) been previously respectively registered for each client account (i.e. during an enrolment or registration phase).

The AUP is associated with the client or a set of clients managed by or for the server 14.

The AUP is stored within a memory that is internal or external to the server 14 while being accessible to the server 14.

The AP is stored within a memory that is internal or external to the server 14 while being accessible to the server 14. The AP may be at least in part included within metadata associated to the requested data. The AP may also be stored at a separate server (not represented).

The data may include information that is sensitive from a client perspective, like e.g., a credit card number, a social security number and/or a key(s), binary data, human readable data and/or a source code(s) (or program instruction(s)). Such a data set is given as mere examples and is therefore not exhaustive.

A metadata attribute(s), as data description information, may include one or several elements of a group comprising:
- a (data) client identity(ies), such as a name(s) and/or an email address(es), an Internet Protocol (or IP) address(es), an IDentifier(s) (or ID) relating to a software component(s);
- a (data) creator identity(ies), such as a name(s) and/or an email address(es);
- a (data) owner identity(ies), such as a name(s) that may change over time e.g., in the case of a data delegation or a ownership change;
- a (data) location(s), such as a server address(es), a database ID(s), as a location(s) on which the (associated) (possibly encrypted) data resides. The data location(s) identifies(y) the location(s) within one or several data repositories that store, possibly in a tamper-resistant manner, the associated (possibly encrypted) data;
- a (data) classification(s), such as Personal Identifiable Information (or PII), Protected Health Information (or PHI), Payment Card Industry (or PCI) information, confidential, private, secret or public;
- a (data) type(s), such as text, image, binary, media, key or certificate;
- an AP: such as a policy that defines one or several data operations that are authorized preferably for a previously successfully authenticated client and that may depend on one or several context signals, such as a location(s), a network(s), an identity(ies), a data type(s) and/or an authentication process(es) used for authorizing the client. The AP defines preferably a part or all of the data, as a data portion, that is accessible preferably for a previously successfully authenticated client;
- an AP location(s), as a location(s) on which the (associated) AP resides, like an IDentifier(s) relating to the AP repository;
- a (data) sharing policy;
- information relating to a (data) encryption process, such as a (data) encryption algorithm and/or a (data) encryption key identifier(s);
- a (data) encryption key(s), as a key for encrypting the associated data;
- a (data) decryption key(s), as a key for decrypting the associated (encrypted) data and a second key(s) allowing to access the associated data. The (data) decryption key(s) may be distinct from a metadata decryption key(s) used for decrypting the (encrypted) metadata;
- a (data) decryption key location(s), as a second secret/data allowing to access the associated data (or a data part) and a location(s) relating to a key(s) for decrypting (encrypted) data (or a data part);
- a set of an application(s) that uses the data (or the data part);
- a (data) backup strategy.

The second data allowing to access the associated data (or data part) may include a location(s) relating to the associated data (or data part). The location(s) relating to the associated data (or data part) identifies(y) the location(s) within a data repository(ies) that store(s) the associated data (or data part).

Such a metadata attribute set is given as mere examples and is therefore not exhaustive.

The data operation(s) that is(are) allowed by the AP may include one or several elements of a group comprising:
- a data creation;
- a data reading;
- a data update;
- a data deletion;
- a data sharing;
- a data ownership change;
- a data visibility;
- a data classification level change.

Such a data operation set is given as mere examples and is therefore not exhaustive.

The AP includes one or several rules for accessing the associated data (or data part).

The AP determines one or several conditions to be satisfied which authorize, once satisfied, to access one or several data items included within the (associated) data.

Instead of being constituted by a PC, the device may be constituted by e.g., a smart phone, a vehicle, a virtual reality device, an augmented reality device, an Internet Of Things (or IoT) type device, a set-top box, a tablet computer, a desktop computer, a laptop computer, a video player, an audio player, a media-player, a game console, a netbook, a Personal Digital Assistant (or PDA) and/or any other computer device. Such a set of devices is given as mere device examples that may be used without being exhaustive.

Instead of being constituted by a physical device, a software component, such as a library, or a hardware component included within or connected to the device carries out the functions that are described infra and that are performed by the PC 12.

The PC 12 includes one or several Central Processing Unit(s) (or CPU), (micro)processor(s) and/or (micro)controller(s) (not represented), as data processing means, one or several memories (not represented), as data storing means, and one or several Input/Output (or I/O) interfaces (not represented).

The (or each) PC processor processes data originating from and/or intended to any internal component and data originating from and/or intended to any external device through one or several PC I/O interfaces.

The PC memories may include one or several EEPROMs (acronym for "Electrically Erasable Programmable Read-Only Memory"), one or several ROMs (acronym for "Read Only Memory"), one or several Flash memories and/or any other memories of different types, like e.g., one or several RAMs (acronym for "Random Access Memory").

A PC memory (and/or a memory of another device connected or coupled to the PC 12) stores an Internet Protocol (or IP) address, as a PC 12 Identifier (or ID), and/or other data that allow(s) uniquely identifying the PC 12.

The PC I/O interface(s) may comprise (and/or be connected to) a display screen 122 and a keyboard 124, as a PC Man Machine Interface (or MMI), so as to interact with the user 11.

The PC I/O interface(s) may include e.g. a camera(s) (not represented), so as to capture a video (or picture) signal(s) that is(are) included in a (local) environment or context 100 that is present in front of the camera.

The PC I/O interface(s) may include (or be connected or coupled to) e.g. one or several sensors that allow, each, to capture one or several signals relating to the context 100 of the user 11.

The PC I/O interface(s) may include e.g., an antenna (not represented), allowing to transmit data, through e.g. a wireless link 13, via one (communication) network(s), such as Intranet and/or Internet, to the server 14.

The channel using the link 13 may be secure or unsecure. The channel may be related to a HyperText Transfer Protocol (or HTTP) (registered trademark) type channel, an HTTP Secure (or HTTPS) type channel or any other data communication channel.

Instead of being constituted by a (physical) server, it may be constituted by e.g., a smart phone, a PC, a vehicle, a virtual reality device, an augmented reality device, an IoT type device, a set-top box, a tablet computer, a desktop computer, a laptop computer, a video player, an audio player, a media-player, a game console, a netbook, a PDA and/or any other computer device. Such a device set is given as mere examples that may be used without being exhaustive.

Instead of being constituted by a physical server, the entity may be constituted by a software component, such as a library, or a hardware component included in (or connected to) the device, that carries out the functions that are described infra and that are performed by the server 14.

The server 14 is remote and accessible through possibly one, two or more communication networks, such as an Intranet network and/or an Internet network, that allow to define or form a corresponding communication channel.

According to an alternative embodiment (not represented), the server 14 or a software component is local. For example, the server 14 is embedded within a device (not represented), such as an SE that is connected or coupled to the PC 12.

The server 14 is preferably accessed through an associated Application Provider Interface (or API) or a Service Provider Interface (or SPI).

The server 14 may be operated or managed by a Mobile Network Operator (or MNO), a Mobile Virtual Network Operator (or MVNO), a banking Operator, a wire communication network operator, a service Operator (or administrator) or on behalf of a service Operator, as a service provider.

The server 14 includes preferably one or several CPU(s), (micro)processor(s) and/or (micro)controller(s), as data processing means 140, one or several memories 142, 144 and/or 146, as data storing means, and one or several I/O interfaces 148 that are internally together connected. Alternately, the server is virtual, i.e. uses some resource(s) that may change over time (in e.g. a cloud computing network).

The (or each) server processor processes data originating from and/or intended to any internal component and data originating from and/or intended to any external device through one or several server I/O interfaces.

A (or the) server I/O interface 148 is used for communicating with an external device(s), such as the PC 12, a Bluetooth type device 16 in the vicinity of the PC 12, a microphone (not represented) in the vicinity of the PC 12, and/or another server 18, so as to get notably one or several context signals.

A (or the) server memory(ies) stores preferably, besides an OS, a (server) invention application accessible from the server 14 processor(s).

A server memory 142 includes an algorithm for generating a first secret/key k1, as first data allowing to access (client) metadata. The first key may be computed by using a derivation function that depends on a user identity and a user credential, such as:

$$k1 = f(\text{user identity, user credential}).$$

As an example, the user identity is a user email, and the user credential is a password. At least one of the user identity (value) and the user credential (value), preferably at least the user credential, is provided by the user at the time of authentication.

The first data allowing to access metadata may include a location(s) relating to the metadata.

Instead of generating the first data, the server 14 is adapted to determine, only if the metadata access is authorized, based on the AP associated with the (concerned) client, associated first data. The associated AP may be associated with the concerned first data allowing to access metadata.

The first data may be a location relating to a key(s) for decrypting the concerned metadata, when the metadata is stored in an encrypted manner.

The first data may be a key k1 for decrypting the concerned metadata, when the metadata is stored in an encrypted manner. k1 depends preferably on the user identity and submitted user authentication data. The metadata is thus accessible, i.e. decrypted, only if the identified user is preferably the genuine one, i.e. the submitted user authentication data matches the reference user authentication data, as per the associated AUP. Otherwise, i.e. if the submitted user authentication data does not match the reference user authentication data, the metadata is not accessible and therefore protected from an attacker. k1 is preferably generated on the fly, i.e. when the server 14 gets the user ID and the submitted user authentication data. k1 may be discarded once used, so as to have an ephemeral life and thus prevent the k1 leakage.

The server 14 manages, within a predetermined AP, a set of client (user and/or application) accounts.

The predetermined AP is preferably associated with a predetermined AUP(s) for each client. The predetermined AUP(s) associate(s) with each client respective reference client authentication data, such as a reference password, a reference PIN, a reference OTP and/or a reference biometric user feature(s).

Each client may be a user (human), a machine or any device, such as an IoT type device.

The AP (or the associated AUP) may include, in association with each (identified) client account, predetermined reference data relating to one or several context signals, so as to verify whether data (to be received from the device and/or an external device(s), that may be local and/or remote) relating to each captured context signal (to be authorized/authenticated according to the associated AP (or AUP), does or does not match (or satisfy) the predetermined reference data relating to the corresponding context signal.

The AUP is stored in a first memory(ies) 142 (or in an external memory (not represented)), as an AUP repository.

Alternately, the AUP is stored in either a metadata repository or a data repository.

The metadata is stored in a second memory(ies) 144 (or in an external memory (not represented)), as a metadata repository(ies).

The associated data (or the associated data part) is stored within a third memory(ies) 146 (or in an external memory (not represented)), as a data repository(ies).

The data repository(ies) is(are) preferably separate from the metadata repository(ies).

Such a separation of the metadata repository(ies) and the data repository(ies) may be physical or logical. Such a separation of the metadata repository(ies) and the data repository(ies) allows isolating access to metadata from access to the associated data (or data part). Such a separation of the metadata repository(ies) and the data repository(ies) allows preventing from a user impersonation and a data breach(es). The metadata and the data repository(ies) are e.g. different databases on one and the same server 14 (or different databases on different servers).

The AP associated with each client (or the APs associated with all of the clients) may be stored in a central location, such as a server, or within the metadata repository(ies) or the data repository(ies).

The server 14 is adapted to control access to data requested by a registered client.

The server 14 may be connected to the Bluetooth type device 16, as local device, over a corresponding wireless link 15.

The server 14 may be connected to another server 18 over a corresponding link 17.

The server 14 may be adapted to identify and authenticate each (or the) signal included in the context 100 of the data access request.

As context signal(s) data, it may notably include:
  a type of the requested data, such as PII, a data classification level, a data ownership, a data access delegation or one or several data operations that the data (and/or associated metadata) should undergo;
  a user identity(ies), such as a user ID, a group ID, a citizenship ID and/or a job title ID;
  a user environment data item(s): such as one or more user owned Bluetooth type devices in the vicinity of the PC 12;
  a device identity(ies), like e.g. a (known, unknown or trusted) device ID, a genuine device (i.e. not rooted),
  a device environment data item(s): such as a device configuration ID(s), such as an OS version and/or an application version;
  a context, as the context that is valid at the time the data is requested to be accessed, such as data relating to the concerned client device, like e.g., a browser ID on a windows machine, and environment information, such as an IP address, a time, data relating to an occupied location;
  historical data item(s), such as the number of times the data has been requested to be accessed and/or the previous possible corresponding access decisions (grant(s) or deny(ies));
  an anomaly detection, while using e.g., a Machine Learning (or ML) engine (or a static rule engine), on all of the other context signals and historical data to analyse a captured context signal(s).

The server 14 is adapted to receive, from an (identified) client (device), such as the PC 12, a request for accessing data.

The server 14 identifies, based on a received e.g. user name and/or a client device ID(s), a corresponding client registered at the server 14 side.

Then, the server 14 retrieves an AP and preferably a predefined AUP associated with the (identified) registered client.

The server 14 is preferably adapted to send to the client, based on the associated AUP, a request to submit one or several client authentication data items.

The server 14 is preferably arranged to receive submitted client authentication data items.

The server 14 is preferably configured to compare, as an authentication step, each of the submitted client authentication data items to the corresponding reference client authentication item respectively, like e.g., the submitted PIN to the (registered) reference PIN and/or the submitted password to the (registered) reference password, according to the associated AUP.

Instead of a direct comparison, the server 14 is connected to an external device or system, so that the external device or system is adapted to compare, as an authentication step, each of the submitted client authentication data items to the corresponding reference client authentication item respectively, according to the associated AUP.

The server 14 is preferably not able to generate e.g. the user credential on its own. Instead, the server 14 uses a one-way function (like e.g., a hash algorithm) to convert user credential into data that the server 14 stores or accesses, and then does the comparison matching.

The server 14 is therefore preferably able to authenticate (or let authenticate by another device or system connected hereto) the user 11 (client) based on a submitted client authentication data item by using a corresponding reference client authentication data item respectively, according to the associated AUP.

The server 14 is preferably arranged to determine, based on the associated AUP the authentication result(s) and the associated AP, whether the metadata access is or is not authorized, as an access decision. If the authentication is successful, then the metadata access is authorized and the server 14 accesses first data (such as k1 needed to decrypt encrypted metadata) allowing to access metadata.

The server 14 may use the memory 142 to run an algorithm to generate k1 or first data allowing to access the associated metadata.

The server 14 is arranged to access (or let another server connected hereto access), based on the associated first data, the associated metadata stored in the memory 144.

The server 14 is arranged to access (or let another server connected hereto access), based on the associated metadata, the associated data (or data part) stored in the memory 146 that is preferably separate from the memory 144 that stores the metadata.

The AP may define, if the data access is authorized (or granted) or is not authorized (or denied), which entitlement(s) (as data operation(s) and/or metadata operation(s)) is(are) granted (to the client) and/or what condition(s) is(are) to be applied/satisfied. The first data, like e.g., the key k1, can also be used to determine the contents of the AP itself.

The AP may include, if the access decision is positive (i.e. the data access is granted), at least one element of a group comprising a data reading entitlement, a data sharing entitlement, a data creation entitlement, a data removal entitlement, a data update entitlement, a data writing entitlement and a metadata update entitlement, the metadata being associated with the concerned data.

Additionally or alternately, the AP includes, if the access decision is positive or negative, as an additional condition(s) to be satisfied prior to and/or after granting access, the following steps of:

requesting to further authenticate the client, as requester, prior to granting access to data;

carrying out one or several actions, prior to granting access to data;

carrying out one or several actions, after granting access to data;

sending and/or logging one or several predetermined alert messages to one or several predetermined addressees.

Such AP element sets are given as mere examples and are therefore not exhaustive.

Figure 2:
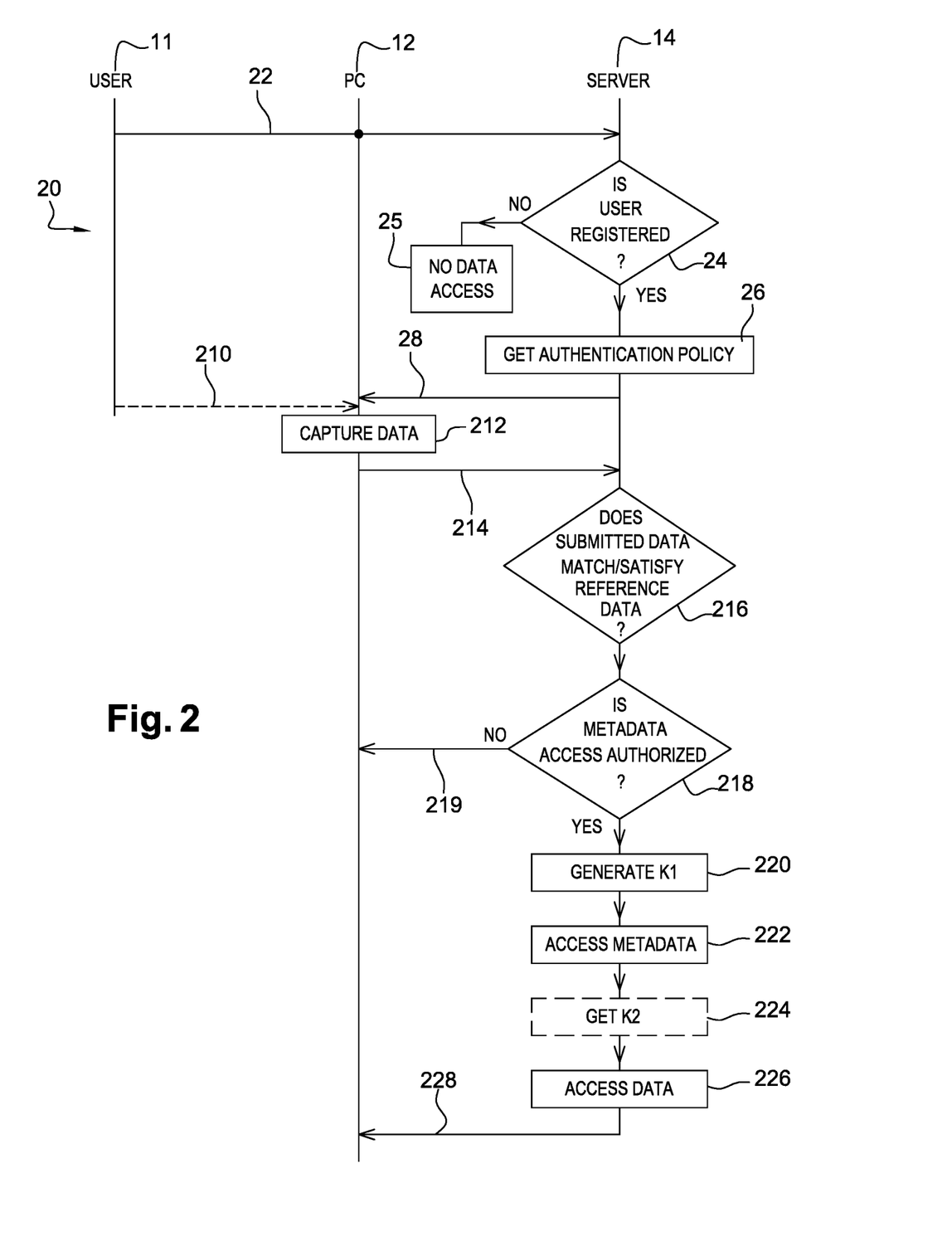
FIG. 2 represents an example of a flow of messages exchanged between the user (or client), the PC and the server of the system of FIG. 1, so that the server identifies the user (or client), determines an associated AP, authorizes (or not), according to the AP, the user (or client), determines, based on the associated AP, an access decision, and provides, based on the associated AP, access to some or all of the requested data, through associated metadata.

FIG. 2 depicts an example of a message flow 20 that involves the user 11, the PC 12 and the server 14, so that the server 14 controls access to requested data through metadata associated hereto.

It is assumed that the server 14 is a standalone entity to determine and provide the requester with requested data, when applicable, i.e. authorized and preferably authenticated. However, the server 14 may delegate to one or several servers, such as an IDentity Provider (or IDP) server(s), one or several operations while collecting back the result(s) of the delegated operations.

It is assumed that the AP has been provided to the server 14 during a personalization phase. The AP includes a set of client accounts.

It is still assumed that the AP is preferably associated with a predetermined AUP(s) for each client.

The AUP requests to capture e.g., a user name, as a user 11 ID, and a challenge, like e.g., a password, so as to authenticate preferably the user 11 (client), as a requirement of client password, as a unique user 11 authentication data item requirement, to access metadata stored in the memory 144. The AUP states, as a positive (or negative respectively) authentication result, that the user 11 is authenticated (or not) if a submitted password, as submitted user authentication data, matches (or does not match respectively) a reference user password, as predetermined reference user authentication data.

It is further assumed that the server 14 has previously registered (not represented) within the AUP, the user 11 ID in association with the predetermined reference user 11 authentication data.

The AP states e.g. the following:

AP1: if the user 11 is (successfully) authenticated and therefore authorized, then the server 14 sends, as an access decision, to the PC 12, a data access granting possibly accompanied with the requested data and giving the user 11 e.g. a data reading entitlement, as a predefined (authorized) data operation;

AP2: if the user 11 is not authenticated and therefore not authorized, then the server 14 sends, as an access decision, to the PC 12, a data access deny possibly accompanied with a message, such as "lack of client authentication", as a reason.

The user 11 launches the client application supported by the PC 12 while using an MMI that is included in or connected to the PC 12.

Alternately, an execution of the client application supported by the PC 12 is automatically launched (i.e. without any involvement of the user 11) (not represented).

Further to an initiative of the user 11, the PC 12 sends, to the server 14, a data access request 22 that includes her/his user name, as user 11 ID.

The server 14 analyses 24, based on the received user 11 ID, whether the user 11 is or is not registered within the AP.

If the user 11 is not registered within the AP, then the server 14 does not grant 25 access to the requested data while possibly sending to the PC 12 a corresponding access deny message.

Otherwise, i.e. if the user 11 is registered within the AP, the server 14 retrieves 26 preferably the associated individual AUP for the concerned registered client. The server 14 gets the associated requirement of a client password, as a unique user 11 authentication data item requirement.

The server 14 sends preferably, based on the unique user 11 authentication data item requirement, to the PC 12 a message 28 for requesting the user to submit credentials, such as a user password.

The PC 12 requests (not represented), preferably while using the PC MMI, the user 11 to submit credentials, such as a user password.

Then, the user 11 enters 210, preferably while using the PC MMI credentials, like e.g., a submitted user password.

The PC 12 (and/or (an)other local device(s)) captures 212 data including possibly a context signal(s) (and/or (an)other local device(s)) and preferably the submitted user password, as credentials.

The PC 12 (and/or (an)other local device(s)) sends preferably to the server 14 (or another server connected hereto) a message(s) 214 that includes the captured data.

Once the server 14 has received the message(s) 214, the server 14 identifies (not represented), based on the PC ID, the concerned client account and thus preferably the associated predetermined reference user 11 authentication data.

Then, the server 14 verifies preferably whether the submitted (captured) data, like e.g., the user password, as the submitted client authentication data, does or does not match (and/or satisfy) the (registered) reference data, like e.g., the reference user password, as the reference client authentication data (or credentials) by e.g. comparing 216 each submitted client authentication data item to a corresponding reference client authentication data item respectively, according to the associated AUP, as the condition(s) to be matched (and/or satisfied by the captured context signal(s) (individually or collectively or in a predefined combined manner)).

Once the verifications 216 of the condition(s) to be matched (and/or satisfied by the captured context signal(s) (individually or collectively or in a predefined combined manner)) have been performed, the server 14 determines preferably, based on the AUP, a corresponding authentication result(s), namely either a success or a failure.

The server 14 determines 218, based on the possible associated AUP, the possible authentication result(s) and the associated AP, whether the metadata access is or is not authorized, as an access decision.

If the metadata access is not authorized, then the server 14 sends to the PC 12 a message 219 that includes a data access deny possibly accompanied with a message, such as "lack of client authentication", as a reason.

Otherwise, i.e. only if the metadata access is authorized, the server 14 generates 220, based on the associated AP1, the associated first secret/key k1, as first data allowing to access the metadata by using e.g., a key derivation function.

The first key k1 may be used to decrypt the metadata stored in the memory 144.

The server 14 accesses 222, only if the metadata access is authorized, based on the first data, the metadata. If the user (or client) authentication is not successful, then the first data allowing to access the metadata is not accessible, such as the correct k1 cannot be generated, and therefore access to metadata, and then access to data cannot be granted.

The metadata may optionally include second secret/key k2, as second data allowing to access the associated data (or data part).

In such an optional case, the server 14 gets 224, only if the metadata access is authorized, based on the metadata, the second data.

The server 14 accesses 226, only if the metadata access is authorized, possibly based on e.g. the associated second key k2, as second data, based on the associated AP, the associated data (or data part).

The location relating to the second key k2 (when present) and the associated data (or data part) itself is obtained from the metadata.

The server 14 sends to the PC 12 a message 228 that includes, based on the associated AP, an access decision possibly accompanied with the (requested) associated data (or data part) and giving the user 11 e.g., a data reading entitlement, as a predefined (authorized) data operation(s) according to the associated AP.

The invention solution allows accessing requested data (or data part), only if the client is successfully authorized and preferably previously authenticated, through metadata that is associated to the data (or data part). Without such a preferable client authentication and a client authorization, the association between metadata and the corresponding data (or data part), the metadata describes, cannot be determined.

The association between data (or data part) and the associated metadata can thus not be used to impersonate the concerned client.

The invention solution allows carrying out a data protection against data breaches and data leaks since data cannot be traced back to its (their) (respective) client(s).

The embodiment that has just been described is not intended to limit the scope of the concerned invention. Other embodiments may be given. As another embodiment, instead of using two separate devices, namely a (client) device and a server, one and the same device implements the claimed invention method.

The invention claimed is:

1. A method for managing access to data, the data being associated with metadata, at least one predetermined access policy for accessing metadata including, for each of at least one client, at least one identifier relating to the client, the method comprising:
   a) receiving, by an entity, from at least one client device, a data access request for accessing data, the data access request including at least one identifier relating to a requesting client, as a user identity;
   b) receiving, by the entity, from the at least one client device, a submitted user credential;
   c) authenticating the requesting client that uses the at least one client device, by the entity, based on the submitted user credential;
   d) determining by the entity, based on an associated access policy, whether the metadata access is or is not authorized, as an access decision;
   e) in response to (i) receiving the submitted user credential, (ii) authenticating the requesting client, and (iii) determining the access decision, generating by the entity an associated first key for decrypting the metadata, using a key derivation function, the key derivation function being dependent on the user identity and the submitted user credential which have been determined to authorize the metadata access;
   f) accessing the metadata, by the entity, using the associated first key for decrypting the metadata;
   g) accessing, by the entity, based on the accessed metadata and the associated access policy, at least a part of the data associated with the metadata, as a late dynamic binding of the metadata with the at least a part of the data associated with the metadata; and
   h) discarding, by the entity, the associated first key for decrypting the metadata.

2. The method according to claim 1, wherein, to carry out step d), the method further comprises: receiving, by the entity, at least one captured context signal, the access decision being further dependent on the at least one captured context signal.

3. The method according to claim 1, wherein the associated first key for decrypting the metadata is a key for decrypting encrypted metadata.

4. The method according to claim 1, wherein, the metadata includes second data allowing the entity to access the at least a part of the data associated with the metadata, the step g) comprises the following steps:
   determining, by the entity, based on the accessed metadata, an associated second data; and
   accessing, by the entity, based on the associated second data, the at least a part of the data associated with the metadata.

5. The method according to claim 4, wherein the second data includes at least one location relating to the at least a part of the data associated with the metadata, the at least one location relating to the at least a part of the data associated with the metadata identifying the at least one location within at least one data repository storing the at least a part of the data associated with the metadata.

6. The method according to claim 1, wherein the metadata includes at least one location relating to the associated access policy.

7. The method according to claim 1, wherein, the at least a part of the data associated with the metadata being stored within at least one data repository, the metadata being stored within at least one metadata repository, the at least one metadata repository is separate from the at least one data repository.

8. The method according to claim 7, wherein the associated access policy for accessing metadata is stored within the at least one data repository or the at least one metadata repository.

9. An entity for managing access to data, the data being associated with metadata, at least one predetermined access policy for accessing metadata including, for each of at least one client, at least one identifier relating to the client, the entity including at least one processor and at least one memory having instructions stored thereon that when executed by the at least one processor cause the at least one processor to:
receive, from at least one client device, a data access request for accessing data, the data access request including at least one identifier relating to a requesting client, as an user identity;
receive, from the at least one client device, a submitted user credential;
authenticate the requesting client that uses the at least one client device, by the entity, based on the submitted user credential;
determine, based on an authentication result and an associated access policy, whether the metadata access is or is not authorized, as an access decision;
in response to (i) receiving the submitted user credential, (ii) authenticating the requesting client device, and (iii) determining the access decision, generate by the entity an associated first key for decrypting the metadata, using a key derivation function, the key derivation function being dependent on the user identity and the submitted user credential which have been determined to authorize the metadata access;
access, using the associated first key for decrypting the metadata, the metadata;
access, based on the accessed metadata and the associated access policy, at least a part of the data associated with the metadata, as a late dynamic binding of the metadata with the at least a part of the data associated with the metadata; and
discard, by the entity, the associated first key for decrypting the metadata.

10. A system for managing access to data, the system comprising at least one entity and at least one device, the data being associated with metadata, at least one predetermined access policy for accessing metadata including, for each of at least one client, at least one identifier relating to the client, each of the at least one entity including at least one processor and at least one memory having instructions stored thereon that when executed by the at least one processor cause the at least one processor to:
receive, from at least one client device, a data access request for accessing data, the data access request including at least one identifier relating to a requesting client;
receive, from the at least one client device, a submitted user credential;
authenticate the requesting client that uses the at least one client device, by the entity, based on the submitted user credential;
determine, based on an authentication result and an associated access policy, whether the metadata access is or is not authorized, as an access decision;
in response to (i) receiving the submitted user credential, (ii) authenticating the requesting client, and (iii) determining the access decision, generate by the entity an associated first key for decrypting the metadata, using a key derivation function, the key derivation function being dependent on the at least one identifier relating to the client and the submitted user credential which have been determined to authorize the metadata access;
access the metadata, based on the generated first data, using the associated first key for decrypting the metadata;
access, based on the accessed metadata and the associated access policy, at least a part of the data associated with the metadata, as a late dynamic binding of the metadata with the at least a part of the data; and
discard, by the entity, the associated first key for decrypting the metadata.

* * * * *